United States Patent [19]

Grant

[11] 4,182,195
[45] Jan. 8, 1980

[54] TRANSMISSION SHIFT CONTROL LOCK ASSEMBLY

[75] Inventor: John W. Grant, Pekin, Ill.

[73] Assignee: Caterpillar Tractor Co., Peoria, Ill.

[21] Appl. No.: 937,232

[22] Filed: Aug. 28, 1978

[51] Int. Cl.$^2$ .............................................. G05G 5/00
[52] U.S. Cl. .................................. 74/473 SW; 74/530; 180/271
[58] Field of Search ............. 74/473 SW, 483 K, 530, 74/475, 477; 192/4 C, 4 A; 180/82 A

[56] References Cited

U.S. PATENT DOCUMENTS

| | | | |
|---|---|---|---|
| 3,054,302 | 9/1962 | Cone | 74/475 |
| 3,480,120 | 11/1969 | Lenzen et al. | 192/4 |
| 3,523,588 | 8/1970 | Bradshaw | 180/112 |
| 3,811,020 | 5/1974 | Johnson et al. | 200/61.88 |

*Primary Examiner*—George H. Krizmanich
*Attorney, Agent, or Firm*—John W. Grant

[57] ABSTRACT

A lock assembly (10) selectively moves and/or maintains a transmission shift control (11) at a neutral position for preventing inadvertent shifting of the transmission. A lever (13) of the transmission shift control (11) is movable in an arcuate pathway between forward and reverse drive positions and through a neutral position intermediate the forward and reverse drive positions. A crank (23) has first and second lever engaging portions (28,29) on a member (27) which is rotatable between a first position at which the lever (13) is free to move between the first and second positions and a second position at which the lever engaging portions (28,29) engage and maintain the lever (13) at the neutral position.

4 Claims, 4 Drawing Figures

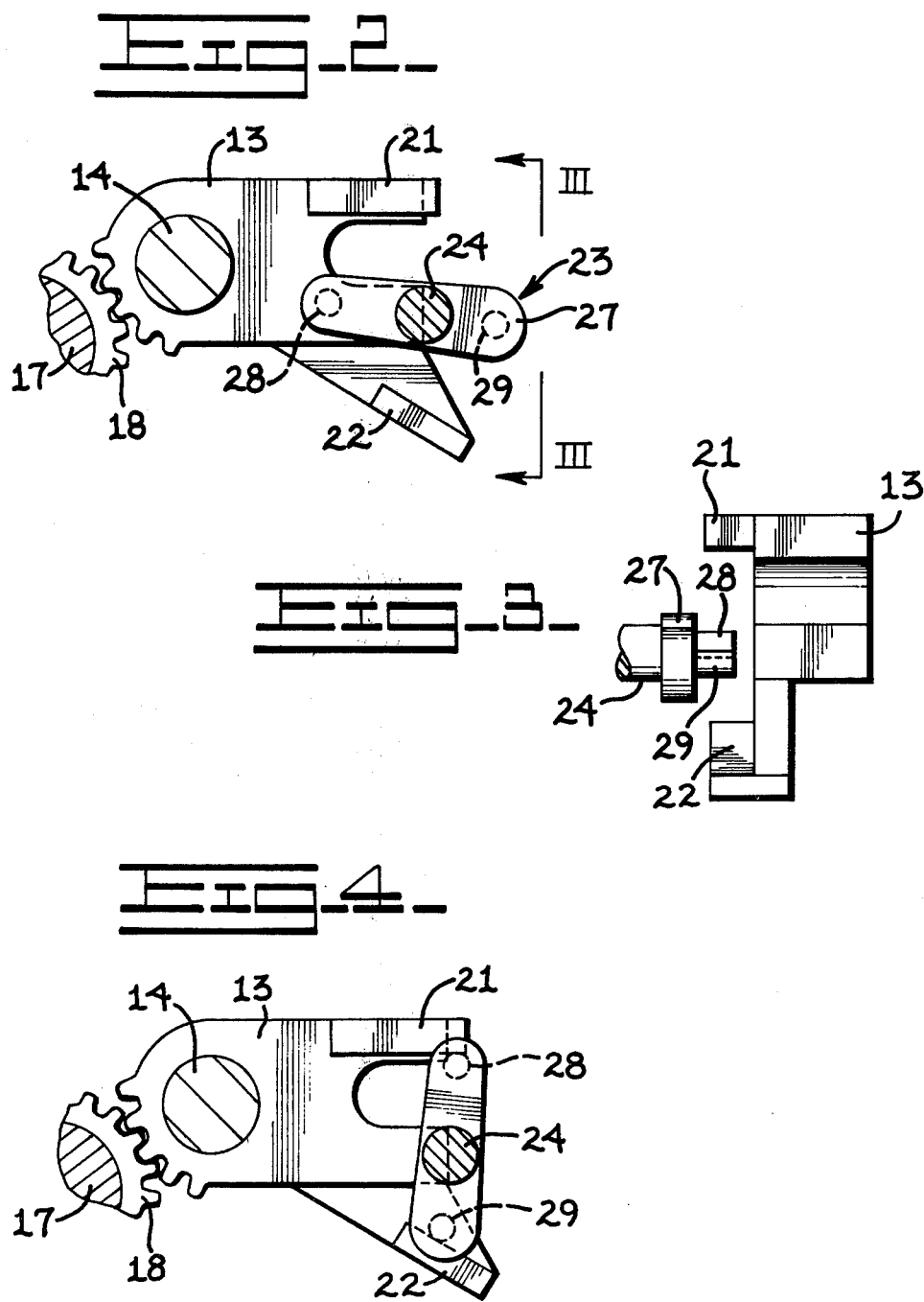

TRANSMISSION SHIFT CONTROL LOCK ASSEMBLY

TECHNICAL FIELD

This invention relates to a lock assembly for moving and/or maintaining a transmission shift control at a neutral position.

BACKGROUND ART

Many vehicles have a transmission neutralizing apparatus for locking the transmission shift control in the neutral position. Some examples of such transmission locking devices are disclosed in U.S. Pat. No. 3,480,120 which issued on Nov. 25, 1969 to L. W. Lenzen et al; U.S. Pat. No. 3,523,588 which issued on Aug. 11, 1970 to N. F. Bradshaw; and U.S. Pat. No. 3,811,020 which issued May 14, 1974 to R. W. Johnson et al.

Such apparatus commonly have the capability of mechanically shifting the transmission shift control to the neutral position from any of the operating positions when the apparatus is manipulated to the lock position. Those apparatus are commonly positioned within an open area of the vehicle and have at least one of the movable elements extending through a slot in a case in which the apparatus is mounted.

Although such apparatus effectively move and lock the transmission shift control in the neutral position, one of the problems encountered therewith is that owing to their particular construction they cannot be readily adapted to a sealed environment. With the elements open to the environment, dust and grit can filtrate into the moving elements. In transmission shift control arrangements which have a push-pull cable connecting the transmission shift control to the transmission, the pushpull cables have a tendency to stick when the slide cable becomes contaminated with dirt or grit. Sticking of the slide cable makes the transmission shift control difficult to shift and might possibly cause the transmission to stick and be maintained in a drive position.

DISCLOSURE OF INVENTION

The present invention solves the problem of providing a sealed environment for a transmission shift control lock assembly by positioning the lock assembly within a housing which also contains elements of the transmission shift control and actuating the lock assembly by rotation of a shaft extending through a bore in the housing. The space between the bore and shaft can thus be readily sealed to prevent infiltration of dust and grit into the housing.

In one aspect of the present invention, a transmission shift control lock assembly has a lever pivotally connected to a support structure. The lever is pivotal in an arcuate pathway between first and second positions at which the transmission is in forward and reverse drive conditions respectively, and has an intermediate position at which the transmission is in neutral. A crank is rotatably connected to the support structure and has a member which has first and second lever engaging portions thereon. The member is rotatable between a first position at which the lever engaging portions are spaced from the lever and the lever is free to move between said first and second positions and a second position at which the first and second lever engaging portions engage and maintain the lever at the intermediate position. A means rotates the crank between said first and second positions.

BRIEF DESCRIPTION OF DRAWINGS

FIG. 2 is a diagrammatic sectional view taken along line II—II of FIG. 1 showing certain elements in an unlocked position.

FIG. 3 is a diagrammatic elevational view as viewed from a plane represented by line III—III.

FIG. 4 is a diagrammatic view similar to FIG. 2 showing certain elements in a locked position.

BEST MODE FOR CARRYING OUT THE INVENTION

Figure 1:
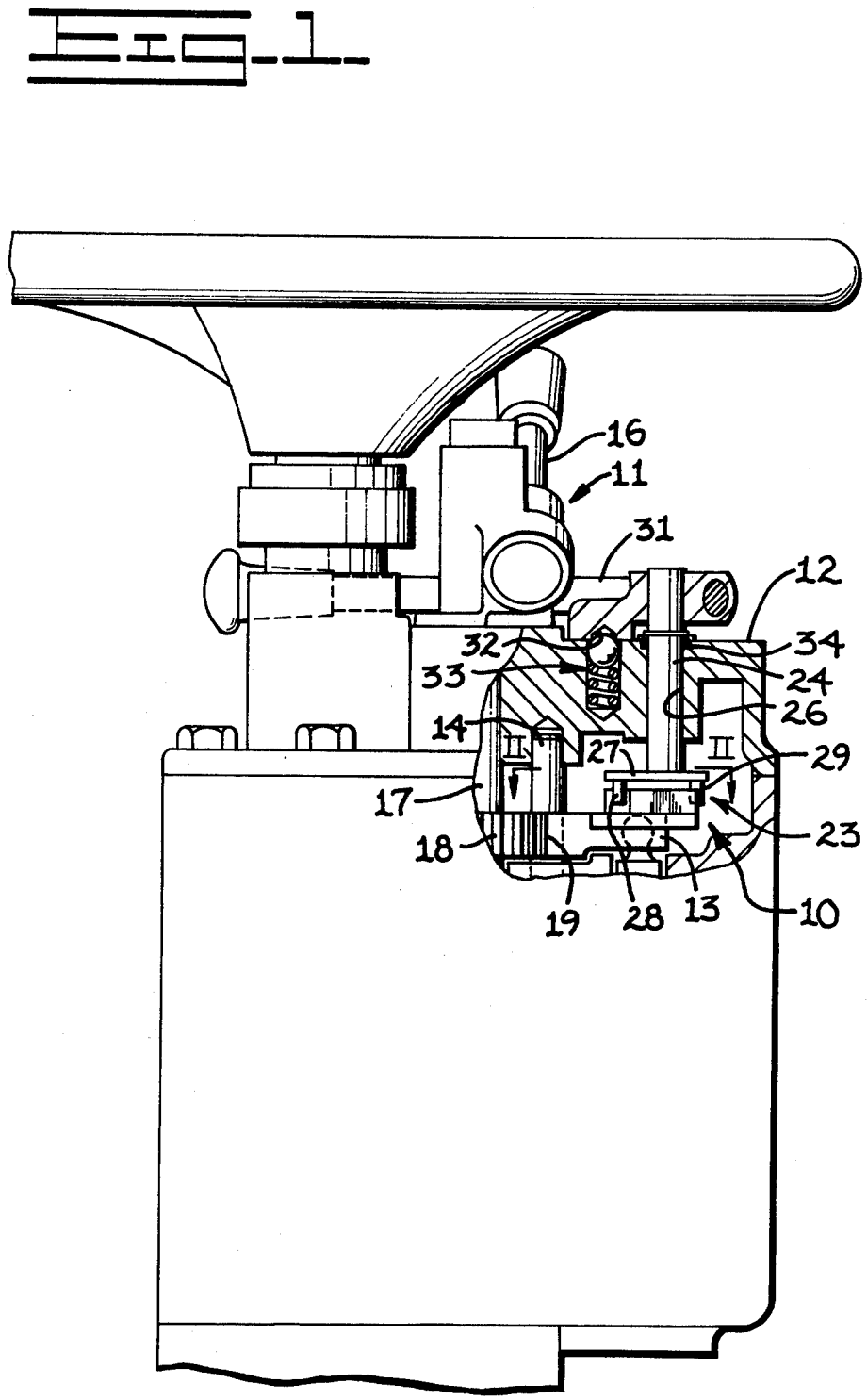
FIG. 1 is a diagrammatic view partially in section of an embodiment of a transmission shift control lock assembly of the present invention.

Referring to FIG. 1 of the drawings, a transmission shift control lock assembly is generally indicated by the reference numeral 10 for moving and/or maintaining a transmission shift control 11 at a neutral position. As in heretofore utilized transmission shift controls, the control 11 has a support structure 12 in the form of a housing or case and a lever 13 which is pivoted on a pivot pin 14 connected to the support structure. The lever 13 is pivotal in an arcuate pathway about pivot pin 14 between first and second positions and has an intermediate position therebetween. The lever 13 is connected to the transmission through a suitable linkage and for an understanding of the present invention, it will suffice to note that the first and second positions of lever 13 correspond to forward and reverse drive conditions respectively of the transmission while the intermediate position corresponds to the transmission being in neutral. Rotation of lever 13 is accomplished through a shift lever 16 connected to a rotatable shaft 17 having a sector gear 18 meshing with a sector gear 19 formed on lever 13.

Referring to FIGS. 2–4, the lock assembly 10 includes first and second cams 21,22 connected to and extending upwardly from lever 13. A crank 23 has a shaft 24 (FIG. 1) positioned within a bore 26 in housing 12 and is substantially perpendicular to the plane in which lever 13 moves. A member 27 is secured at its mid portion to the lower end of shaft 24 and has first and second lever engaging portions in the form of pins 28,29 extending downwardly from the end portions thereof. The crank 23 and thus member 27 and pins 28,29 are movable between a first position as shown in FIG. 2 at which the pins are spaced from cams 21,22 of lever 13 so that the lever is free to pivot about pivot pin 14 between the first and second positions and a second position as shown in FIG. 4 in which the pins are positioned for engagement with cams 21,22 of lever 13 for maintaining the lever in its intermediate or neutral position.

A means, for example, an actuating lever 31 (FIG. 1) is connected to the outer end of shaft 24 and is movable between first and second positions for moving crank 23 and thus member 27 and pins 28,29 between the first and second positions.

A pair of recesses, one shown at 32, are positioned in actuating lever 31 and are elements of a detent means 33 for resiliently maintaining the actuating lever at its first and second positions. A seal 34 is seated in a recess in the housing 12 for sealing between the shaft 24 and the housing.

INDUSTRIAL APPLICABILITY

In operation, when the crank 23 and hence the member 27 and pins 28,29 are in their first position as shown in FIG. 2, the lever 13 is free to move between its first and second positions so that the transmission can be shifted between forward, neutral, and reverse drive conditions. To lock the transmission shift control 11 in the neutral position, the operator rotates the actuating lever 31 in the appropriate direction to rotate the crank 23 clockwise from the position shown in FIG. 2 to the position shown in FIG. 4. With pins 28,29 in the position shown in FIG. 4, engagement between the first cam 21 and pin 28 prevents rotation of the lever 13 to the first position while engagement between second cam 22 and pin 29 prevents rotation of lever 13 to the second position.

Should the lever 13 be in its first position prior to rotation of the actuating lever 31, pin 28 will engage first cam 21 thereby moving the lever 13 from the first position to the neutral position. Conversely, should the lever be in the second position prior to rotation of the actuating lever and crank 23, pin 29 will engage second cam 22 and move the lever from the second position to the neutral position. The actuating lever is held in the respective positions by detent means 33. Thus, the transmission shift control 11 is held in the neutral position so that the transmission cannot be shifted to a drive condition.

To unlock the transmission shift control 11, the operator rotates actuating lever 31 and hence crank 23, member 27, and pins 28,29 counterclockwise from their second position to their first position. With the pins at their second position, the lever 13 is free to rotate between its first and second positions.

Other aspects, objects, and advantages of this invention can be obtained from a study of the drawings, the disclosure, and the appended claims.

What is claimed is:

1. A transmission shift control lock assembly (10) for a transmission shift control (11) having a support structure (12) and a lever (13) pivotally connected to the support structure (12), said lever (13) being pivotal in an arcuate pathway in a first plane between first and second positions at which the transmission is in forward and reverse drive conditions, respectively, said lever (13) having an intermediate position at which the transmission is in neutral, comprising:

a crank (23) rotatably connected to the support structure (12) and having a member (27) which has first and second lever engaging portions (28,29) thereon, said member (27) being rotatable in a plane substantially parallel to said first plane between a first position at which the lever engaging portions (28,29) are spaced from the lever (13) and the lever (13) is free to move between said first and second positions and a second position at which the first and second lever engaging portions (28,29) engage and maintain the lever 13 at the intermediate position; and means (31) for rotating the crank (23) between said first and second positions.

2. The assembly of claim 1, including first and second cams (21,22) connected to said lever (13), said lever engaging portions (28,29) being positioned for engagement with said first and second cams (21,22).

3. The assembly of claim 3 wherein said lever engaging portions (28,29) are a pair of pins connected to and extending downwardly from member (27).

4. The assembly of claim 1 wherein said lever engaging portions (28,29) are so constructed and adapted for moving said lever (13) from the respective first and second positions to the intermediate position in response to movement of the crank (23) from the first position to the second position.

* * * * *